March 5, 1946. P. A. NOXON 2,396,116
CABIN PRESSURE CONTROL
Filed Jan. 9, 1942 5 Sheets-Sheet 4

INVENTOR.
Paul A. Noxon
By C. J. Kalman
his ATTORNEY

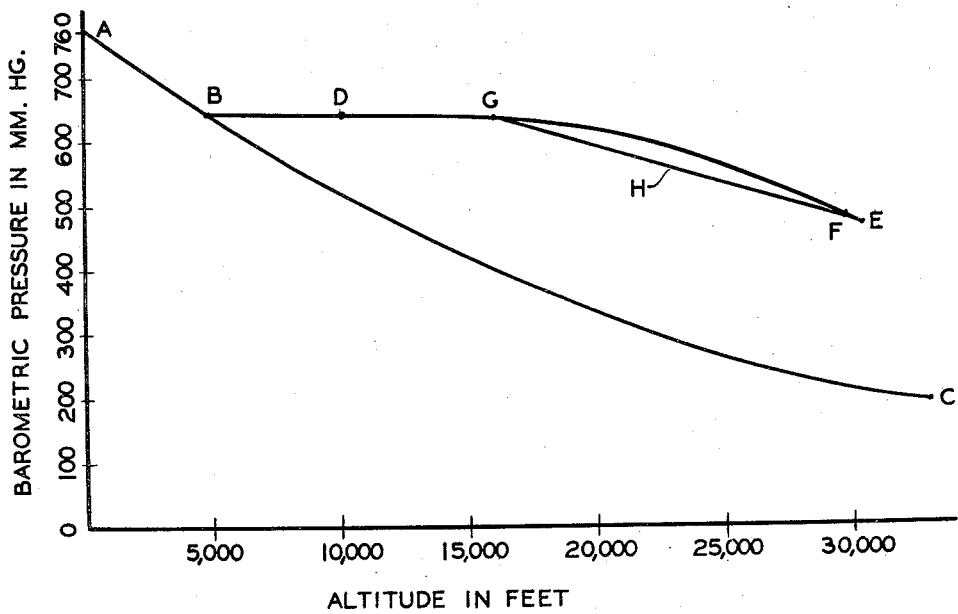

Patented Mar. 5, 1946

2,396,116

UNITED STATES PATENT OFFICE 2,396,116

CABIN PRESSURE CONTROL

Paul A. Noxon, Tenafly, N. J., assignor to Bendix Aviation Corporation, Bendix, N. J., a corporation of Delaware Application January 9, 1942, Serial No. 426,262

21 Claims. (Cl. 98—1.5)

This invention relates generally to pressure control for chambers or compartments and more particularly to cabin pressure control in aircraft or the like.

An object of the present invention is to provide a novel arrangement or system for the control of pressure within the interior of cabins or compartments on aircraft used in traversing variable external pressure areas so as to automatically maintain desirable and predetermined pressure conditions within the cabins or compartments.

Another object of the invention is to provide a novel pressure control system for aircraft cabins wherein the cabin pressure is maintained substantially the same as the external pressure up to a predetermined altitude and, thereafter, it is controlled progressively and proportionately in accordance with external pressure variation, subject to a further and modifying control in the event of predetermined rates of exterior pressure change.

A further object of the invention is to provide a novel pressure control system for aircraft cabins wherein sudden and undesirable rates of pressure change within the cabins are prevented during sudden rates of climb or descent of the craft, while during normal flights up to a predetermined altitude the pressure within the cabins is substantially the same as the external pressure.

Another object of the invention is to provide a novel pressure control system for aircraft cabins adapted to limit the rate of change of pressure within the cabins to a predetermined value.

A further object is to provide a novel pressure regulating system which will maintain aircraft cabin pressures proportional to flight altitudes of the craft and also limit the rate of cabin pressure change to a predetermined value during sudden rates of craft climb or descent.

Another object is to provide a novel fluid pressure regulating system whereby aircraft cabin pressure will be controlled, during craft flight through low pressure areas, at pressures proportional to and greater than the external pressures.

A still further object of the invention is to provide a novel control apparatus for aircraft cabin pressure whereby cabin pressure is maintained proportional to external altitudes which exceed a pre-selected control altitude and the rate of change of cabin pressure is controlled only when the cabin pressure is greater than the external pressure.

Another object of the invention is to provide a novel fluid pressure control apparatus for automatically regulating aircraft cabin pressures to predetermined and desirable values during both normal flights through varying pressure areas and flights which necessitate sudden rates of craft climb and/or descent.

A further object is to provide a plurality of novel cabin valves arranged for synchronous parallel operation for opening and closing communication of the cabin with the exterior thereof.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention, reference for the latter purpose being had primarily to the appended claims.

In the drawings, wherein like reference characters refer to like parts, throughout the several views:

Figure 5 is a graph of altitude-pressure curves showing the operational characteristics of the present invention.

Figure 1:
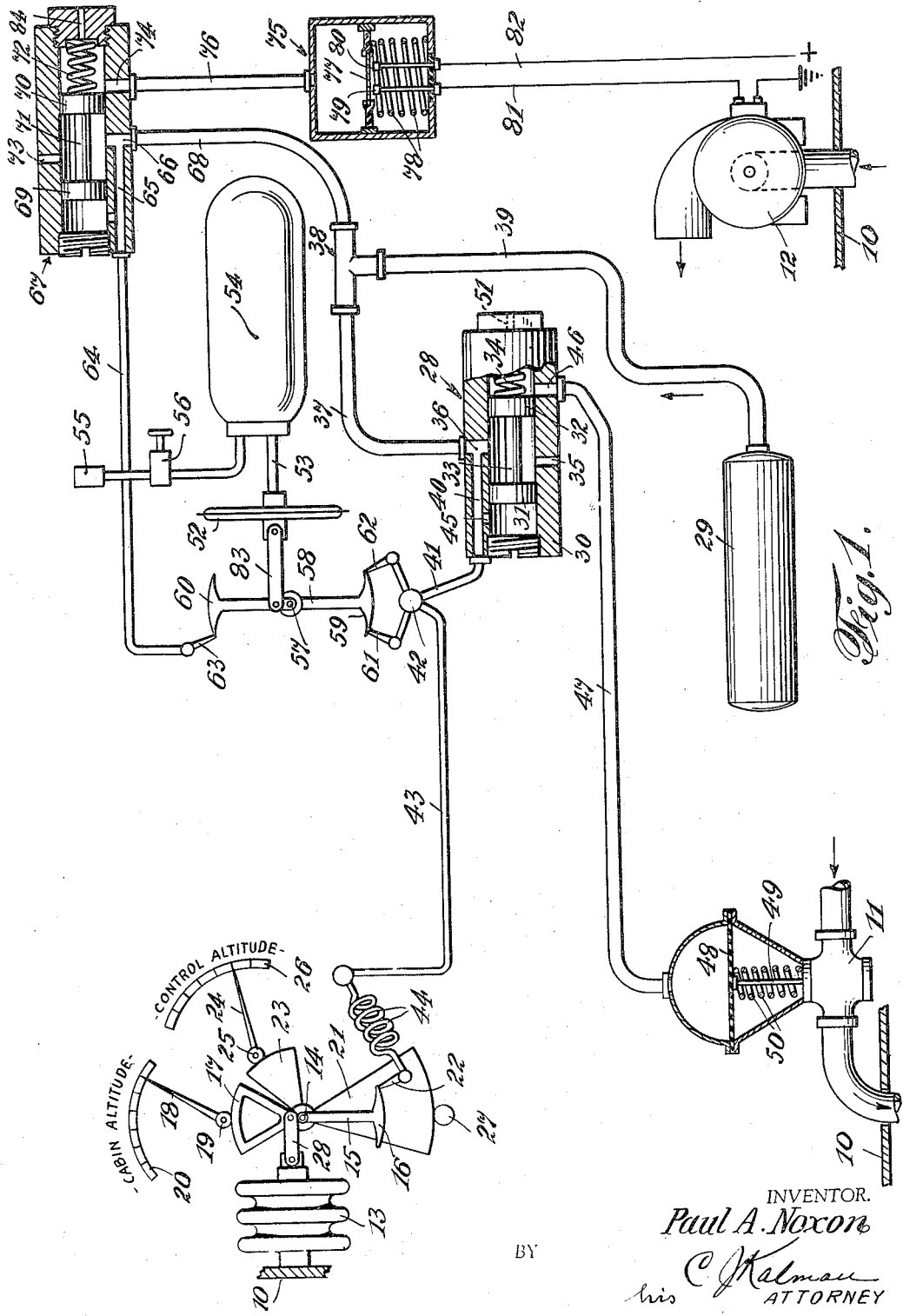
Figure 1 is a schematic view, partially in section, of one embodiment of the novel cabin pressure control arrangement of the present invention.

For a more detailed description of the various parts constituting the novel cabin pressure control arrangement of the present invention, reference is made to Figure 1 of the drawings wherein is illustrated one form of the novel apparatus for initiating or closing, at a preselected altitude, communication between cabin interior and exterior, and for limiting the rate of pressure change within the cabin during a predetermined rate of change of craft flight.

The apparatus is suitably mounted within a sealed airtight cabin having a wall 10, of which only fragmentary portions are shown, provided with openings for accommodating the intake of a cabin valve 11 which normally communicates the interior of the cabin with the exterior thereof and the intake of a supercharger 12 which, when energized, builds up pressure within the cabin and also provides ventilation for the cabin.

Mounted upon wall 10 is an evacuated bellows member or aneroid 13 which is sensitive to cabin pressures only and, though normally collapsed, expands progressively as the surrounding pressures decrease.

A rock-shaft 14 has mounted thereon for angular movement therewith a link 15 which is provided at its lower end with an obstructing vane 16 and at its upper end with a sector 17 which, upon movement, actuates a pointer 18, pivoted at 19, for movement over a scale 20 which may be designated as "Cabin altitude."

Sleeved about rock-shaft 14, and immediately in back of link 15, is a sector-shaped element 21 which supports a small air nozzle 22 thereon and has, at its upper end, a smaller sector 23 engaging a pointer 24, pivoted at 25, for movement over a second scale 26 which may be designated as "Control altitude." The pointers and scales have been shown at different positions relative to each other for purposes of clarity; however, in practice, they would be arranged concentrically with each other.

An adjusting knob 27 engages element 21 whereby, when so desired, nozzle 22 may be displaced relative to vane 16 so that the nozzle will be uncovered sooner or later by the expanding or contracting aneroid and, simultaneously with the adjustment, sector 23 actuates pointer 24 to indicate on scale 26 the value of the altitude at which control of the nozzle will begin or end.

The movable end of aneroid 13 carries an arm 28 which is secured to link 15, at a point above the pivotal axis defined by rock-shaft 14, so that upon expansion of the aneroid, link 15 is caused to swing vane 16 in a clockwise direction to uncover nozzle 22, and upon contraction of the aneroid to swing vane 16 in a counter-clockwise direction to cover the nozzle.

A novel air-relay 28 is provided which communicates fluid pressure from a suitable pressure source 29 to valve 11 under the influence and control of nozzle 22 in a manner now to be described.

Air relay 28 comprises a hollow cylinder 30 having mounted for reciprocal movement therein pistons 31 and 32, connected together by a rod 33, and being yieldably urged to a left-hand position, as shown in Figure 1, under the influence of a spring member 34.

Cylinder 30 of the air relay is further provided with an exhaust port 35 and an inlet port 36 which communicates with pressure source 29 by way of a conduit 37, joint 38, and a conduit 39. A passage 40 provided in the cylinder wall communicates inlet port 36 with nozzle 22 by way of a conduit 41, junction 42, and a conduit 43. Since conduit 43 is stationary and nozzle 22 is movable, a coiled tubing 44 is provided between the nozzle and the conduit so as to accommodate nozzle movement.

The interior of cylinder 30 is in communication to the left of piston 31 with passage 40 by way of a port 45 while to the right of piston 32 the cylinder has an outlet port 46 which communicates with valve 11 by way of a conduit 47.

When the craft, upon which a cabin is mounted incorporating the subject matter of the present invention, is at a landing field, aneroid 13 is collapsed and vane 16 covers nozzle 22 so that air pressure flowing from source 29 through passage 40 of relay 28 to the nozzle passes to the cylinder interior by way of port 45 to build up pressure on piston 31 which is moved to the right against the action of spring 34 until piston 31 closes exhaust port 35 and piston 32 opens outlet port 46 for communication with inlet port 36 so that the pressure source is in direct communication with valve 11 by means of conduit 47.

Air pressure so communicated to valve 11 urges a resilient diaphragm 48 downwardly together with a spindle 49 against the action of a spring 50 to open the valve whereby the interior and exterior of the cabin are in communication. In this manner and during normal craft flights at altitudes below the altitude for which the aneroid has been set to control nozzle 22, the pressures exteriorly and interiorly of the cabin are substantially the same.

As the craft attains the preselected altitude, determined by setting of knob 27, aneroid 13 has expanded to the extent that vane 16 is swung far enough in a clockwise direction to partially uncover nozzle 22. Air pressure exhausts through the nozzle to relieve the pressure stored up on the left side of piston 31 and spring 34 urges pistons 31, 32 to the left to close communication between the inlet and outlet ports and simultaneously uncover exhaust port 35. The pressure previously acting on diaphragm 48 passes to the interior of the cabin by way of a vent 51 provided in cylinder 30 so that spring 50 urges diaphragm 48 and spindle 49 upwardly to partially close the valve until a condition of balance between cabin pressure, nozzle opening, and cabin valve opening is secured. Since the air relay provides a sensitive control, a small movement of the aneroid will effect a large change in cabin valve opening; hence, the cabin pressure will be practically a constant while the control is operating.

It is well known that during excessive craft climb or descent the excessive rate of change of pressure which results within the cabin causes great discomfort to the occupants of the cabin and to overcome this undesirable condition, novel apparatus is provided for limiting the rate of cabin pressure change during such craft climb or descent.

The latter apparatus comprises a diaphragm 52 which has a movable end and a stationary end, the latter having a conduit 53 for communicating the interior of the diaphragm with an expansion chamber 54 which is in restricted communication with the cabin pressure by way of a calibrated leak 55, while the outside of the diaphragm is subjected directly to cabin pressure. This mechanism embodies the "rate of climb" instrument principle for measuring the rate of change of pressure. The rate of pressure change at which the diaphragm is to expand or collapse may be preselected by means of a trimmer adjustment 56 present in the restricted communication between the expansion chamber and the interior of the cabin.

A rock-shaft 57 supports for pivotal movement therewith an arm 58 which is provided with obstructing vanes 59, 60 at each of its ends. Vane 59 normally covers two nozzles 61 and 62 while vane 60 normally covers a nozzle 63.

Nozzles 61 and 62 are connected in parallel with nozzle 22 and communicate with cylinder inlet port 36 and passage 40 by way of junction 42 and conduit 41, while nozzle 63 connects by way of a conduit 64 with a passage 65 which, in turn, communicates with an inlet port 66 of a second air relay 67.

A conduit 68 connects the relay inlet port 66 with pressure source 29 by way of joint 38 and conduit 39 so that normally when the nozzle 63 is covered, pressure is built up on the left of a piston 69 and this piston, together with a piston 70 connected thereto by way of a rod 71, moves to the right against the action of a spring member 72 to close an exhaust port 73 of the relay and to open communication between inlet port 66 and an outlet port 74.

A diaphragm operated motor switch 75 connects with outlet port 74 by way of a conduit 76 so that when inlet port 66 and outlet port 74 have been placed in communication pressure from source 29 urges a diaphragm supported contact plate 77 against the action of a spring 78 to engage contacts 79 and 80, which by way of leads 81 and 82, connect a suitable energy source to operate supercharger 12. With the exception of one condition, to be described hereinbelow, the supercharger remains energized to build up pressure within the cabin and also to ventilate the cabin.

The control previously described embodying the aneroid 13 acts to permit cabin pressure to drop to a value corresponding to a preselected or predetermined altitude at which the control of the nozzle 22 is set to be uncovered by adjustment of the knob 27 and the pointer 24 with respect to the scale 26. Control of the nozzle 22 on craft climb begins when the craft leaves the ground and ends upon the craft reaching the preselected altitude at which the device is set to operate and vice-versa on descent and hence, the rate control apparatus acts through the aneroid 13 to limit the rate of cabin pressure change only at altitudes below the preselected control altitude and also above said altitude and for excessive rate of craft climb or descent, by means of the diaphragm 52 and associated parts.

Assuming craft flight below the preselected control altitude, and rapid rate of craft climb, the rate of cabin pressure change increases and this rapid drop in cabin pressure acting on diaphragm 52 causes the latter to expand because the pressure drop on the outside of the diaphragm is greater than the interior thereof due to the restricted communication between the diaphragm interior and the cabin.

Expansion of diaphragm 52 in this manner swings arm 58, with which the free end of the diaphragm connects by way of a link 83 secured above the pivotal axis of the arm defined by rockshaft 57, in a counter-clockwise direction to thereby uncover nozzle 61, while nozzle 62 remains closed.

Since nozzles 22, 61 and 62 have been normally covered, pressure has been built up on the left of piston 31 whereby inlet port 36 has been in communication with valve 11 by way of outlet port 46 thus maintaining the valve open. Uncovering of nozzle 61, however, results in release of the pressures stored on the left of piston 31 and spring 34 urges pistons 31 and 32 to the left to interrupt communication between outlet port 46 and inlet port 36. Valve 11 is thus closed and the undesirable rate of pressure drop is prevented by reason of diaphragm 52 and nozzle 61 assuming primary control of relay 28 notwithstanding the fact that nozzle 22 has been covered by virtue of the aneroid control.

Assuming, now, craft flight slightly below the preselected altitude with nozzle 22 covered and valve 11 open, a rapid rate of descent results in a rapid rate of pressure rise within the cabin. Pressures being greater on the exterior of diaphragm 52 and the diaphragm interior being in restricted communication with the cabin, the resulting differential pressure collapses diaphragm 52 whereby arm 58 is swung in a clockwise direction to open nozzle 62 as well as nozzle 63.

Although nozzles 22 and 61 are covered, accumulated pressures to the left of piston 31 are released through nozzle 62 and valve 11 is again closed as described in connection with nozzles 22 and 61 to prevent excessive rate of pressure increase within the cabin.

At the same time, the accumulated pressures to the left of piston 69 of relay 67 are released through uncovered nozzle 63 and spring 72 forces pistons 69 and 70 to the left to close communication of inlet port 66 with outlet port 74 so that pressure now flows through exhaust port 73 while the pressure formerly acting on contact plate 77 is released through a vent 84 and spring 78 urges contact plate 77 upwardly to open the circuit and de-energize the supercharger.

It will be seen that in the control apparatus of Figure 1, aneroid 13 and nozzle 22, normally, have primary control of valve 11; however, during rapid craft climb or descent, diaphragm 52 comes into operation and it, together with nozzles 61 and 62, overrides the first control to thereby limit the rate of pressure change within the cabin to a predetermined and desirable value.

Once the preselected control altitude has been attained, cabin pressure is maintained substantially constant by the control apparatus of Figure 1. If craft flight exceeds the preselected control altitude, the cabin pressure should no longer be maintained constant since undesirable stresses would be created on the cabin and for this reason the control system of Figure 1 may be arranged to provide greater range control whereby upon flight above the preselected control altitude, the cabin pressure will be proportionately decreased to avoid the foregoing undesirable condition.

Figure 2:
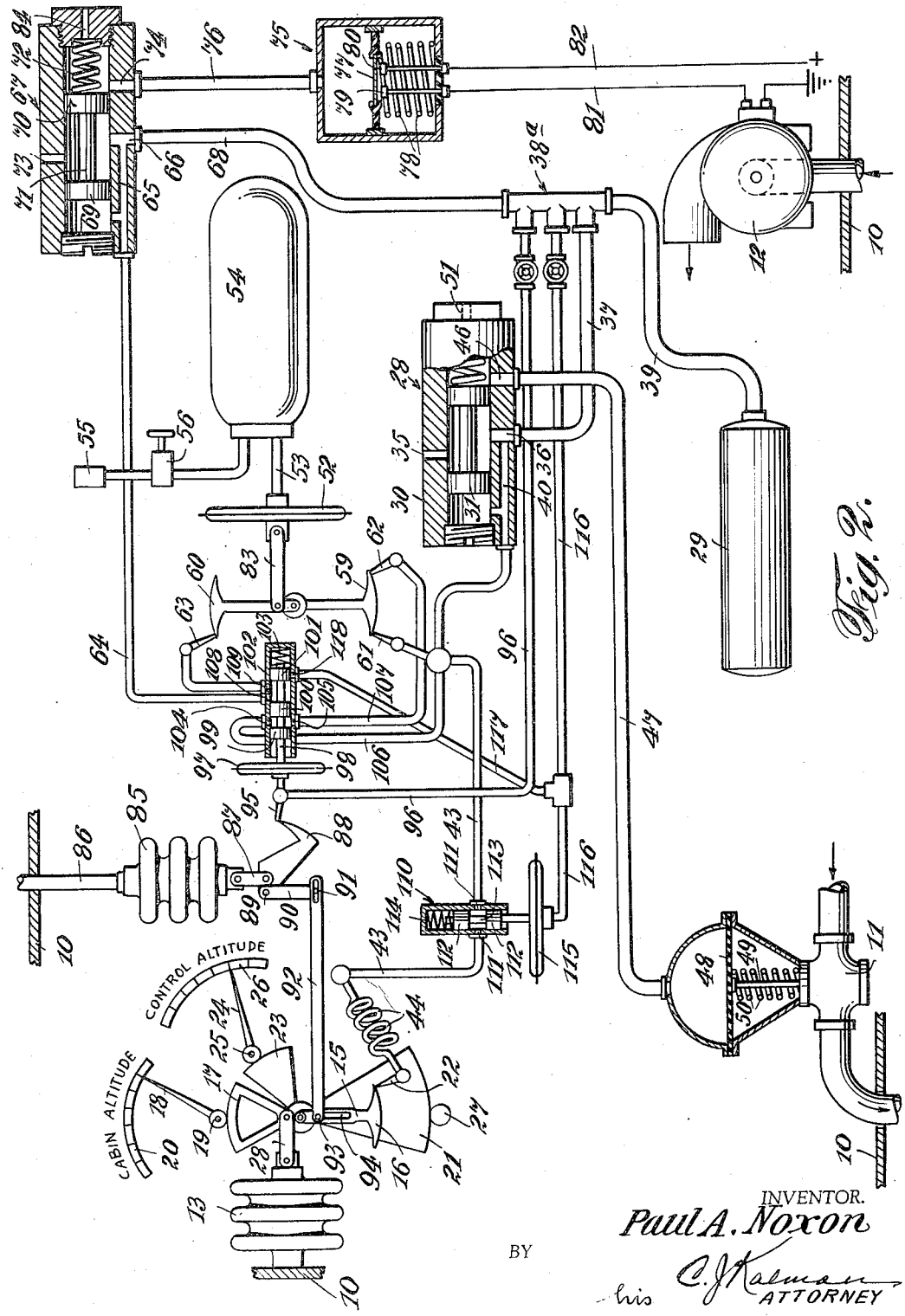
Figure 2 is a schematic view, partially in section, of the novel cabin pressure control arrangement of Figure 1 adapted for wider range control.

The adaptation of the system of Figure 1 for greater range control is illustrated in Figure 2 of the drawings wherein parts corresponding to like parts in Figure 1 are designated with the same reference characters. Essentially, the systems are the same, except that the arrangement of Figure 2 contains an element responsive to differential pressure between the inside and outside of the cabin to provide a pressure within the cabin which is proportional to flight altitude during flight above the preselected control altitude.

The differential pressure responsive element comprises a bellows member 85 at the fixed end of which is a conduit 86 communicating the interior of the bellows with the exterior of the cabin. The free end of the bellows is provided with a link 87 connected to a vane member 88 which is pivoted for movement about a floating pivot 89. This pivot is defined by one end of a link 90 at the other end of which is a pin 91 for engaging a slotted portion of a connecting link 92, the latter having its adjacent end slotted to receive the pivot pin 31 to provide a lost-motion connection with the link 90, in turn, being provided at its opposite end with a pin 93 for engaging a slot 94 formed in link 15 also forming a delayed or lost-motion connection. When the pressures inside and outside of the cabin are substantially equal, the vane member 88 connected with member 85 maintains uncovered a nozzle 95 which communicates with pressure source 29 by way of a valve-controlled conduit 96, joint 38a and conduit 39.

Nozzle 95 is secured to the fixed end of a diaphragm 97 and communicates with the interior thereof. The free end of the diaphragm carries a rod 98 having mounted thereon pistons 99, 100 and 101 which are mounted for reciprocal movement within a cylinder 102, a spring 103 normally urging the pistons to the left as shown in Figure 2.

Cylinder 102 is provided with diametric ports 104 and 105, the former connecting by way of a conduit 106 with nozzle 61 and the latter connecting by way of a conduit 107 with nozzle 62 whereby nozzles 61 and 62 are connected to pressure source 29 in parallel with nozzle 22. Furthermore, the cylinder has two adjacent ports 108 and 109, the former connecting by way of conduit 64 and passage 65 with the inlet port 66 of the second air relay 67, and the latter communicating with nozzle 63.

Interposed in conduit 43, which communicates nozzle 22 with air relay 28, is a control valve 110 comprising a cylinder provided with diametric ports 111 associated with both ends of conduit 43, and pistons 112 mounted on a rod 113 operating through one end of the cylinder for reciprocal movement within the cylinder. The pistons are urged downwardly by means of a spring member 114 to close ports 111 and the free end of rod 113 is secured to the movable end of a diaphragm 115, the fixed end of which is provided with a valve-controlled conduit 116 communicating the interior of diaphragm 115 with pressure source 29. Connected in conduit 116 is a second conduit 117 which communicates with a normally closed port 118 formed in the valve cylinder 102.

Since port 118 is normally closed by piston 101, pressure builds up within diaphragm 115 to cause it to expand and move pistons 112 against spring 114 to open ports 111 and, hence, communication between nozzle 22 and air relay 28.

Normally, and prior to craft flight above the preselected control altitude, nozzle 22 is in free communication with air relay 28 by means of conduit 43 whereby upon attainment of the preselected control altitude, aneroid 13 expands and uncovers nozzle 22 to close cabin valve 11 while, during rapid rate of climb or descent, nozzles 61 and 62 are in parallel whereby upon a predetermined drop in cabin pressure, diaphragm 52 expands, nozzle 61 is uncovered to close valve 11 while, upon rapid increase in cabin pressure diaphragm 52 collapses, nozzle 62 is uncovered to close the cabin valve and nozzle 63 is uncovered to de-energize the supercharger.

During craft flight below the preselected control altitude, aneroid 13 expands sufficiently to partially uncover nozzle 22 to operate the cabin valve so that cabin pressure is maintained substantially constant. At point A, bellows 85 overruns aneroid 13 and thereafter for flights above this preselected altitude, maintains a substantially constant differential between cabin pressure and exterior pressure. When craft flight exceeds the preselected altitude value, bellows member 85 is collapsed due to the increased differential in inside and outside pressures so that the free end of the member moves upwardly thereby picking up link 92 with a delayed or lost-motion movement, thus applying a counter force on link 15 against the force of the expanded aneroid. This counter force swings vane 16 slightly to close nozzle 22 whereby valve 11 is opened to decrease cabin pressure.

In the above manner link 92 provides an additional load on aneroid 13 which is equivalent to an increased tension on the aneroid. The load is proportional to the differential of the inside and outside cabin pressures and thus, while the cabin pressure is still controlled by nozzle 22, the actual value of the cabin pressure obtained is proportional to the differential pressure and, hence, the cabin pressure will be proportionately decreased with increased flight altitude. The proportional value to be maintained as between outside and inside pressures may be determined by adjusting the point at which link 92 engages with the end wall of the slot 94 of link 15.

At the same time that the differential member 85 modifies aneroid control of nozzle 22 at altitude flights exceeding the preselected altitude, it also acts to modify the function of the rate of pressure change device so that the latter, in addition to acting in the same manner as described in connection with the system of Figure 1 below the preselected altitude, also acts to limit rate of change of cabin pressure for flight altitudes exceeding the preselected altitude.

Simultaneously with the collapse of differential member 85, vane 88 is moved in a counter-clockwise direction to close nozzle 95. Pressure can no longer exhaust through nozzle 95 so it passes to the interior of diaphragm 97 to expand the latter whereby pistons 99, 100 and 101 are moved to the right against the action of spring 103 so that piston 99 closes nozzle 62 off from nozzle 61, while piston 100 closes port 108 and thus the motor switch 75 from control by nozzle 63, and piston 101 opens nozzle 63 to port 118 to operate valve 110.

At too rapid a rate of climb above the preselected altitude, the pressure drop within the cabin is greater than the pressure drop within rate diaphragm 52 due to its restricted communication with the cabin pressure so that diaphragm 52 expands swinging vane 59 to the right to uncover nozzle 61. Pressures stored to the left of piston 31 escape through nozzle 61 and valve 11 is closed, in the manner previously described, thereby preventing undesirable rapid rate of pressure drop within the cabin.

At a rapid rate of craft descent from an altitude exceeding the preselected control altitude, diaphragm 52 collapses, swinging vane 59 to the left and vane 60 to the right to uncover nozzles 62 and 63. Nozzle 62 is shut off by way of piston 99 from nozzle 61 and relay 28 so that it has no controlling force thereon while nozzle 63, by virtue of piston 100 closing port 108, no longer controls motor switch 75 but does control valve 110 so that, upon pressure exhaust through nozzle 63, diaphragm 115 collapses and spring 114 urges pistons 112 downwardly to close ports 111. Though nozzle 22 is uncovered by virtue of aneroid 13 so as to keep valve 11 closed, communication between nozzle 22 and air relay 28 is closed and pressure accumulates to the left of piston 31 moving the latter to the right so that valve 11 is opened. Valve opening is important at this condition because otherwise, during craft descent, the exterior pressures would increase rapidly while interior pressure would remain the same.

As soon as inside and outside pressures equalize, the differential element 85 returns to its normal position, uncovering nozzle 95, and diaphragm 97 collapses so as to move pistons 99, 100 and 101 against the action of spring 103 and the system now operates as described in connection with Figure 1.

It will be seen that a control system, essentially the same as the system of Figure 1 has been provided, which contains an element responsive to differential pressure between the inside and outside cabin pressures to control cabin pressure in proportion to flight altitudes above the preselected altitude and which also acts to control the rate of change of pressure device so that the rate of change of cabin pressure will be limited and controlled for flight altitudes exceeding the upper limit of the preselected altitude.

Referring now to the curves of Figure 5, the curve ABC shows the relationship of altitude and atmospheric pressure. At 16,400 feet the atmospheric pressure is approximately 380 mm. Hg, or one-half that at sea level, while at 32,800 feet the atmospheric pressure is approximately one-quarter that at sea level.

With the plane flying below the control altitude set by knob 27, the aneroid 13 will expand slightly, but insufficiently to move vane 16 to uncover nozzle 22. The valve 11 communicating with the atmospheric pressure will remain open; the pressure inside the cabin being very nearly equal to that of the atmosphere. Adjusting the knob 27 arbitrarily at a control altitude of 5,000 feet, the pressure in the cabin of the plane rising above 5,000 feet will cause aneroid 13 to expand sufficiently to uncover nozzle 22 to operate valve 11. From the operation previously described, valve 11 will "flutter" from an open to a closed position balancing the interior cabin pressure and the exterior atmospheric pressure. At point D, which has been chosen arbitrarily at 10,000 feet, the cabin pressure is substantially equal to the atmospheric pressure at 5,000 feet, the interior pressure of the cabin following the curve ABD in a flight from sea level to 10,000 feet.

Above 10,000 feet, valve 11 will remain closed the greater part of the time due to a slight loss in cabin pressure due to leakage.

Figure 3:
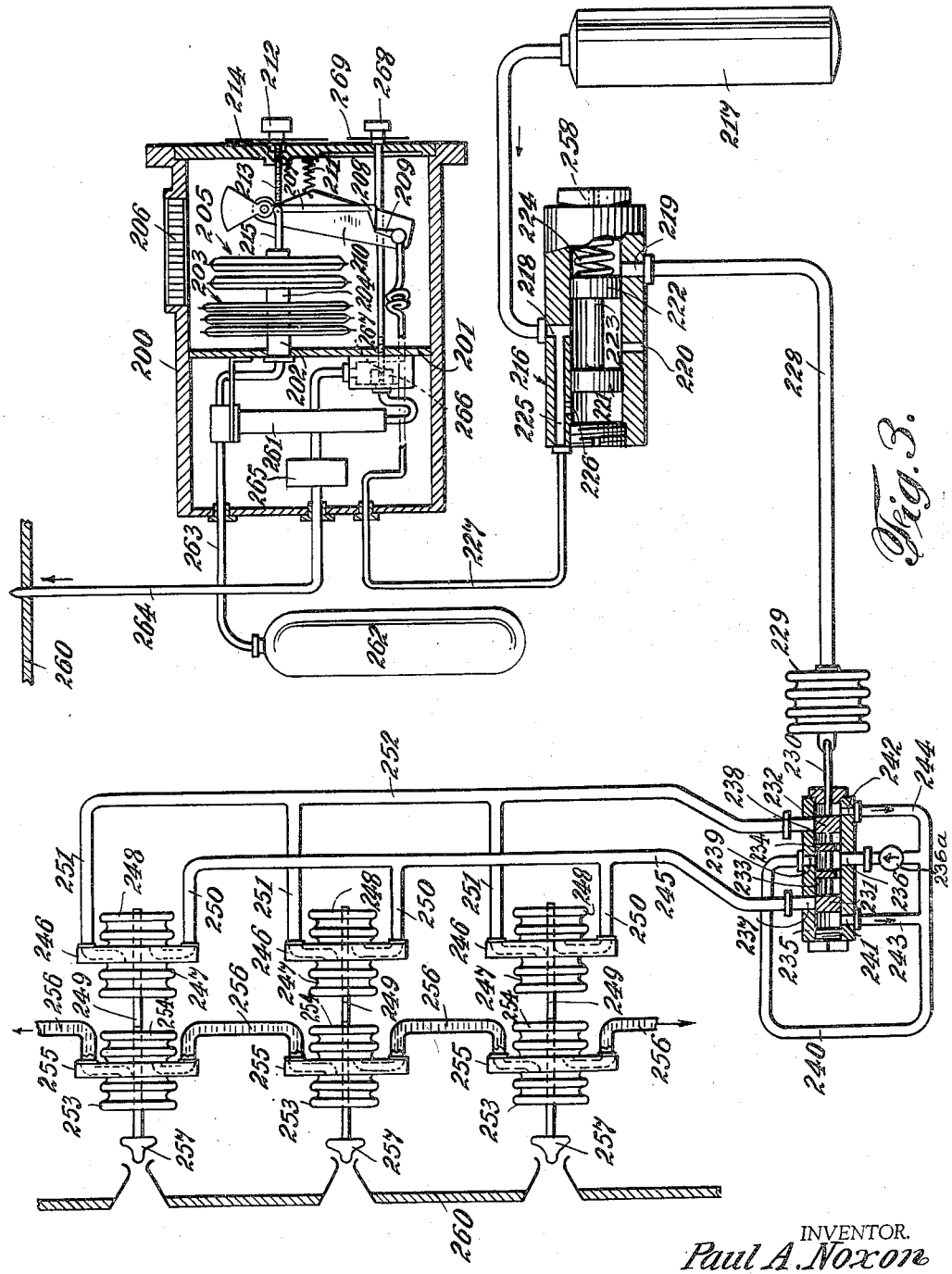
Figure 3 is a schematic view, partially in section, of a second embodiment of the novel cabin pressure control system of the present invention.
Figure 4:
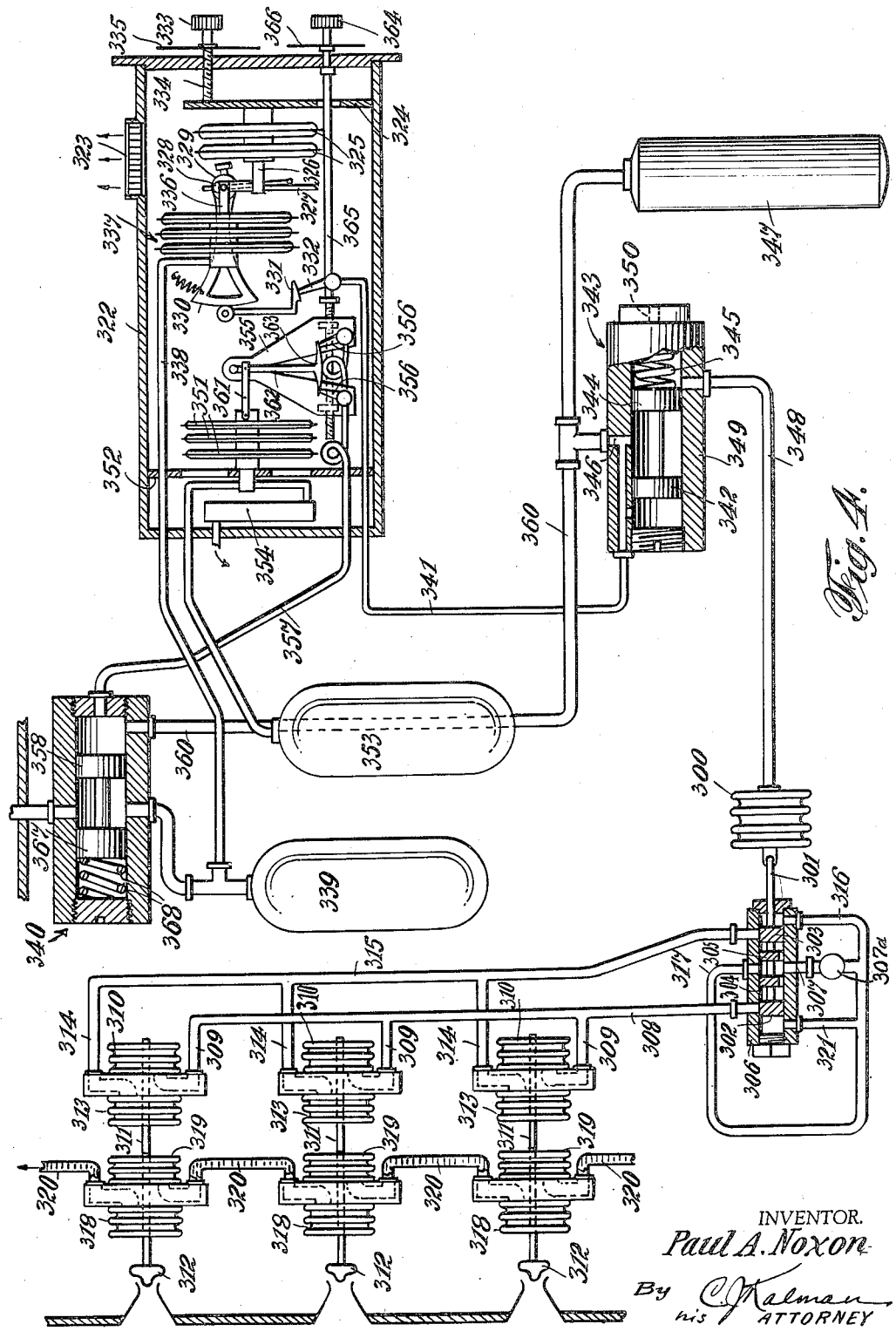
Figure 4 is a schematic view, partially in section, of the novel cabin pressure control system of Figure 3 adapted for wider range control.

Upon a further ascent to approximately 16,000 feet, or point G on the curve, the pressure within the cabin is slightly less than that at 10,000 feet. Since the differential between the atmospheric pressure and the cabin pressure is increasing, the structure as shown in Figures 2, 3 and 4 comes into play to prevent rupture of the cabin walls. In ascending from 16,000 feet to 30,000 feet, that portion of the curve designated as GE indicates a decrease in cabin pressure. The cabin pressure as designated by point E is approximately that which would be encountered at 12,500 feet. The average healthy person can undergo a reduced pressure of 460 mm. Hg without serious ill-effects.

Thus, in a normal flight from sea level to 30,000 feet, the cabin pressure is represented by the curve ABDGE. Other control altitudes may well be set with knob 27, the points B, D, G, and E assuming different values than those designated on Figure 5, the new curves being approximately of the same form as the curves shown.

In rapid ascents or descents, it is imperative that excessive rates of change in pressure be avoided. As previously described, the rate of change of pressure is controlled by member 52. A typical ascent or descent curve at which the rate of change of pressure is controlled, is shown by the curve portion FHG. If we are to assume a plane flying at 30,000 feet, and it is desired to descend quickly to 16,000 feet, the cabin pressure would be that indicated by the curve EFHGD. The curve FHG is closer to an ideal curve for a uniform rate of change in pressure than curve EFG, the increase in pressure in the first 5,000 feet being 60 mm. Hg. as compared to 80 mm. Hg., and in the next 5,000 feet the increase being 55 mm. Hg. as compared to 60 mm. Hg. From point G to point D on the curve, the pressure of the cabin is the same as that under normal flight above the control altitude.

In the foregoing discussion of Figure 5, the altitudes and pressures indicated were chosen arbitrarily for the purposes of illustration. With the proper cabin construction and a proper supercharger 12 the herein described device may well be used to pressurize air craft cabins up to 60,000 feet. The same controls as set forth will also control the differential pressure of cabin and atmosphere, preventing the cabin pressure from falling below 400 mm. Hg., the atmospheric pressure encountered at 15,000 feet, which may be endured by the average person without ill-effects.

Referring now to Figure 3 of the drawings, a simplified arrangement of the cabin pressure control apparatus is provided which comprises an arrangement whereby cabin pressure is maintained proportional to atmospheric pressure and whereby upon the occurrence of rapid craft climb or descent the cabin pressure will be controlled at a lower and proportional rate.

The operating mechanism of this arrangement is embodied within a suitable housing 200 having a plate 201 therein for supporting the hollow base 202 of a differential pressure element 203 comprising a plurality of diaphragms as shown in Figure 3.

Mounted concentrically with and secured to element 203 by means of a rod 204 is an aneroid device 205 comprising two or more evacuated diaphragms. During flights up to a preselected altitude, element 203 remains in a normal and stationary position, since the pressures inside and outside of the cabin are substantially equal, while aneroid device 205 expands outwardly relative to element 203. The interior of housing 200 is open to cabin pressure by way of a filter element 206.

A link 207 is pivotally mounted within the housing and is provided at its lower end with an obstructing vane 208 which normally covers a nozzle 209, the latter being mounted upon a supporting plate 210 for movement therewith immediately behind and concentrically with the pivotal axis of link 207.

Plate 210 is normally urged to a predetermined position by means of a spring 211 and can be adjusted to any predetermined position to select the altitude at which nozzle 209 is to be uncovered. This adjustment is accomplished by way of a control knob 212 mounted outside of the housing which displaces longitudinally a threaded spindle 213 engaging plate 210 at a point below the pivotal axis thereof. A pointer 214 is movable with the control knob to indicate upon a scale (not shown) the value of the altitude at which cabin control is to begin or end; the scale may be designated as "Control altitude" in the manner illustrated in Figure 1.

A link 215 secured to the movable end of the aneroid device 205 pivoted to link 207 at its free end below the pivotal axis of the link whereby upon increased altitudes the aneroid device expands swinging vane 208 to the right to uncover nozzle 209 while upon decreased altitudes the aneroid device collapses swinging vane 208 to the left to cover the nozzle.

An air relay 216 under the influence and control of nozzle 209 connects and disconnects a fluid pressure source 217 to open and close novel hydraulic cabin valves to be described more fully hereinbelow.

The air relay comprises a cylinder having inlet and outlet ports 218, 219 and an exhaust port 220. Mounted for reciprocal movement within the cylinder are pistons 221 and 222 carried by a rod 223 and urged to the left of the cylinder by means of a coiled spring member 224 so that the outlet port 219 is closed off from the inlet port 218. A passage 225, furthermore, communicating with the inlet port 218 is formed in a wall of the cylinder and a port 226 communicates the interior of the cylinder to the left of piston 221 with the passage 225.

A conduit 227 connects passage 225 with nozzle 209 so that, when the nozzle is covered by vane 208, pressure accumulates to the left of piston 221 urging it together with piston 222 to the right against the action of spring 224 to close exhaust port 220 and open outlet port 219 to inlet port 218 whereby pressure from source 217 is communicated by way of a conduit 228 to the interior of a fixed Sylphon 229, the free end of which has secured for movement therewith a piston rod 230.

Piston rod 230 carries pistons 231 and 232 as well as channelled pistons 233 and 234 for reciprocal movement within a valve cylinder 235 which is provided with an inlet port 236 and outlet ports 237 and 238 which are normally closed by pistons 231 and 232 so that fluid passes from inlet port 236 to a normally open outlet port 239 and back to a source 236a by way of a conduit 240. Drain ports 241 and 242 connect with conduit 240 by way of branch conduits 243 and 244.

With the expansion of Sylphon 229, rod 230 is moved to the left whereby piston 231 opens port 237 for communication with inlet port 236 while channelled piston 234 closes outlet port 239 and at the same time port 238 is open to drain port 242. Fluid pressure is now available in a conduit 245 which communicates with port 237 for operation of the novel cabin valves.

Stationary brackets 246 each support a pair of Sylphons 247, 248, one end of each Sylphon of each pair being secured to its corresponding bracket while the free ends of each pair of the Sylphons carry valve rods 249 for movement therewith. Conduit 245 is provided with branch conduits 250 which communicate with the interior of Sylphons 248 so that upon fluid pressure flow in conduit 245 and branch conduits 250 Sylphons 248 expand causing Sylphons 247 to contract. Fluid normally contained in Sylphons 247 is caused to flow out therefrom through branch conduits 251 to conduit 252 which, in turn, connects with port 238 so that the fluid from the contracted Sylphons 247 flows to drain port 242 and back to source 236a. As Sylphons 248 expand and Sylphons 247 contract valve rods 249 are moved to the right.

Each valve rod 249 is connected with the free ends of each pair of fluid filled Sylphons 253, 254, the inner ends of which are secured to stationary brackets 255. Each Sylphon 253 connects by way of a conduit 256 with the Sylphon 254 of the adjacent pair so that upon movement of the valve rods to the right, for example, the fluid from contracting Sylphons 253 flows to fill up the space provided by the adjacent expanded Sylphon 254. This arrangement permits parallel and simultaneous operation of cabin valves 257 and avoids hunting action on the part of any one valve which would otherwise occur.

When the preselected altitude has been attained, aneroid device 205 expands thereby uncovering nozzle 209 and pressures on the left of piston 221 are released causing spring 224 to urge pistons 221 and 222 to the left thereby interrupting communication between relay outlet port 219 and inlet port 218 and opening the latter port to exhaust port 220. Pressure stored within Sylphon 229 exhausts through a vent 258 by way of outlet port 219. Sylphon 229, upon its collapse, urges rod 230 to the right whereby piston 232 opens outlet port 238 to inlet port 236 by way of channelled piston 234 and at the same time closes drain port 242, while channelled piston 233 closes port 239 while piston 231 opens port 237 to drain port 241.

Fluid under pressure from source 236a now flows through port 238 to conduit 252 and to Sylphons 247 by way of branch conduits 251 to expand the latter. At the same time Sylphons 248 are caused to contract and fluid therefrom flows through branch conduits 250, conduit 245 and drain port 241 by way of port 237. Valve rods 249 are moved to the left and Sylphons 254 contract so that fluid therefrom passes through conduits 256 into the adjacent and expanded Sylphons 253 and valves 257 are thus urged toward their valve seats formed in cabin wall 260, only fragmentary portions of which are shown.

If nozzle 209 were controlled only by aneroid device 205, once the preselected altitude was reached the cabin pressure would remain substantially constant notwithstanding how much craft flight exceeded the preselected altitude. In order to control the cabin pressure proportionately to craft flight the interior of the differential pressure element 203 is connected through a restricted leak device 261 with an expansion chamber 262 by way of a conduit 263 and the pressure outside of the cabin by way of a conduit 264. The latter conduit is provided with a filter 265 and an adjustment device having a passage 266, the opening of which to the restricted leak device 261 is controlled by a needle valve 267 having a control knob 268 outside of housing 200. A pointer 269 is provided for movement over a suitable scale (not shown) so as to indicate the desired differential pressure that is to be maintained between inside and outside pressures and at which element 203 will function as a control.

When craft flight exceeds the upper limit of the preselected altitude, the pressures within the cabin exceed the exterior pressures and when the desired differential pressure is exceeded element 203 collapses and moves aneroid device 205 to the left therewith which results in swinging vane 208 to partially cover nozzle 209 and thus open the cabin valves, as heretofore described, until the desired differential pressure between inside and outside cabin pressures has been attained. Thus, element 203 overrides the control of nozzle 209 by aneroid device 205 and itself assumes primary control thereof.

During a rapid rate of craft climb or descent at altitudes exceeding the preselected altitude, the differential element 203 does not immediately respond at its interior to the rapid drop or increase in outside pressures but lags behind by virtue of the restricted leak and expansion chamber so that its control of the aneroid device 205 and nozzle 209 together with cabin pressure change will be at a lower and proportional rate to the rate of exterior pressure change, that is, it will act as a function of the exterior rate of pressure change.

With the foregoing arrangement, it will be seen that neither cabin pressure nor the rate of cabin pressure change will be controlled until a preselected flight altitude is attained and, thereafter, the cabin pressure will be lowered progressively as craft flight increases and at a lower and proportional rate during a rapid rate of craft flight above the critical altitude.

A control system, similar to the system of Figure 3, is shown in Figure 4 and differs over the former system in the provision of a rate of pressure change device which controls the communication of the differential pressure element with the atmosphere so that the proportional cabin pressure control during flights exceeding a preselected altitude is limited in the rate at which pressure change takes place in the cabin during rapid craft flight over the critical altitude.

The novel hydraulically operated cabin valves are the same in construction and operation as those shown in connection with the control system of Figure 3. Upon expansion of a Sylphon 300, a piston rod 301 provided with pistons 302, 303 and channeled pistons 304 and 305 is moved to the left within a valve cylinder 306. Piston 302 opens inlet conduit 307 for communication with outlet conduit 308, which, by way of branch conduits 309, transmits fluid pressure from a source 307a to Sylphons 310 which expand carrying valve rods 311 to the right to open cabin valves 312, while Sylphons 313 contract expelling the fluid normally therein by way of branch conduits 314 to a conduit 315 which, in turn, is open to a drain conduit 316 whereby fluid from Sylphons 313 flows to the source intake.

The foregoing operation results for the reason that upon movement to the left of piston rod 301, channelled piston 305 has closed communication between inlet conduit 307 and an outlet conduit 317 while piston 303 has opened conduit 315 for communication with drain conduit 316.

In order to assure simultaneous operation of the cabin valves, each valve rod 311 is further connected to a pair of Sylphons 318 and 319. With movement of the valve rods to the right, Sylphons 319 expand while Sylphons 318 contract causing fluid flow therefrom to fill the space in the adjacent expanded Sylphon 319 with which it connects by way of conduit 320.

In the event that controlling Sylphon 300 contracts, piston rod 301 is moved to the right whereby piston 303 closes the drain conduit 316 from conduit 315 and opens conduit 315 to communicate with inlet conduit 307 by way of a channelled piston 305, while channelled piston 304 closes outlet conduit 317, and piston 302 opens conduit 308 to a drain conduit 321. Fluid pressure flow from source 307a is thus reversed and now Sylphons 318 and 319 contract while Sylphons 313 and 318 expand moving valve rods 311 to the left and, hence, cabin valves 312 to their closed position.

The pressure regulating mechanism is mounted within a suitable housing 322 having a filter 323 for opening the housing interior to the prevailing cabin pressure. A plate 324 within the housing mounts an aneroid device 325 which at its free end connects by way of a link 326 with a floating link 327.

A rock-shaft 328 is suitably mounted within the housing and has sleeved thereabout for movement therewith a hub 329 of a spring restrained sector element 330 which engages a vane 331 for movement relative to a nozzle 332 for opening or closing thereof. Floating link 327 is secured to hub 329 below the pivotal axis of shaft 328 so that upon expansion of aneroid device 325, link 327 is swung to the left causing sector 330 to move to the left and vane 331 to the right to uncover nozzle 332.

Nozzle 332 is stationary and the time at which it is to be opened or closed by the aneroid device may be determined by way of a knob 333 mounted externally of housing 322 and having a spindle 334 secured thereto for engaging and moving plate 324 whereby the aneroid device 325 is adjusted to control the nozzle at a preselected altitude. A pointer 335 may be provided to move with the control knob over a suitable scale (not shown) to appraise the operator of the altitude at which cabin control will begin or end.

Also secured to floating link 327 and above the pivotal axis of hub 329 is a connecting link 336 carried by the free end of a differential pressure responsive element 337, the interior of which connects at its stationary end by way of a conduit 338, expansion chamber 339, and relay 340 with the pressure outside of the cabin.

At flight altitudes below the preselected altitude, the aneroid device 325 is collapsed and vane 331 maintains nozzle 332 covered, and the latter, by way of a conduit 341, builds up pressure on the left of a piston 342 of a relay 343 so that piston 342, together with a piston 344 moves to the right against the action of a spring member 345 to open an inlet port 346 and pressure source 347 to conduit 348 which communicates with the interior of controlling Sylphon 300 to expand the latter and open the novel cabin valves in the manner heretofore described so that cabin pressure is substantially the same as outside pressure.

As the craft upon which the present control system is mounted climbs through the preselected altitude, aneroid device 325 expands sufficiently to move vane 331 to partially uncover nozzle 332 thereby releasing pressures accumulated to the left of piston 342 of relay 343 so that pistons 342 and 344 move to the left under the action of spring 345 to close Sylphon 300 from source 347 and open the source to a relay exhaust port 349. A vent 350 provided in the relay permits exhausting of the Sylphon whereby the latter moves piston rod 301 to the right to tend to close the cabin valves thereby causing the cabin pressure to increase to a point where a condition of equilibrium is obtained between nozzle opening, cabin valve opening and cabin pressure.

With a further and progressive flight altitude increase above the preselected altitude, differential element 337 collapses because the cabin pressure exceeds the pressure at its interior which is the same as the outside pressure. Link 336 is moved to the left thus swinging link 327 about its connection with the aneroid link as a pivot in a counter-clockwise direction so that sector 330 moves in a counter-clockwise direction and vane 331 moves to the left to cover nozzle 332 to partially open the cabin valves in the manner before described so that cabin pressure is progressively decreased as craft flight increases. Hub 329 is adjustable angularly about shaft 328 so that sector 330 may be initially displaced any desired amount and, therefore, the desired differential pressure to be maintained may be predetermined. At a pressure differential greater than the predetermined amount element 337 will act as a control by moving vane 331.

During a rapid rate of craft climb above the preselected altitude the differential pressure element 337 collapses rapidly and causes a rapid rate of pressure change within the cabin. To overcome this rapid rate of change, a rate of pressure change device is provided which comprises diaphragms 351 mounted within housing 300 by means of a suitable plate 352.

The interior of diaphragms 351 is in restricted communication with the cabin pressure by way of an expansion chamber 353 and a restricted leak device 354 while the exterior of the diaphragms is exposed directly to cabin pressure. A forked plate 355 mounted for pivotal movement supports a pair of nozzles 356 which are arranged in parallel and communicate by way of a conduit 357 to the right of a piston 358 of relay 340. Pressure source 347 is in communication with the air relay 340 to the right of piston 358 by way of a conduit 360 for purposes to presently appear.

The movable end of the rate of pressure change device 351 is connected by way of a link 361 to a link 362 which is provided with a vane 363 at its lower end for cooperation with nozzles 356. For preselecting the rate of change of pressure at which the rate device is to control the communication of the differential pressure responsive element 337 with the atmosphere outside of the cabin, a control knob 364 is provided outside of the housing and carries a spindle 365 which engages with forked plate 355. A pointer 366 may be provided for movement with the control knob to indicate upon a suitable scale (not shown) the rate of change of cabin pressure at which the rate device will operate.

Normally when the rate of change of cabin pressure is below a predetermined value, nozzles 356 are covered by vane 363. However, during a rapid craft climb, pressures interior of diaphragms 351 cannot immediately equalize with the cabin pressure due to restricted leak 354 and for that reason the diaphragms are caused to expand and thus swing vane 363 to the right uncovering left nozzle 356 thereby releasing the accumulated pressure on the right of piston 358, the latter having been previously moved to the left together with a piston 367 against the action of a spring member 368 due to the accumulated pressures from the source when nozzles 356 were covered.

Pistons 358 and 367 are normally urged to the right by the action of spring 368 and thus tend to close communication between the expansion chamber 339 of the differential pressure responsive element 337 and the pressures outside of the cabin. Closing communication in this manner by way of piston 367 results in limiting the rate at which the differential pressure responsive element can respond to outside pressure changes and thus the rate at which the cabin pressure will change. Piston 367 moves far enough to the right until a condition of equilibrium is established by the opening of the left nozzle 356 and the rate of change of cabin pressure. As soon as level flight is established the rate device assumes the normal position closing off both nozzles 356 and pressure is built up to the right of piston 358 to again move the latter to the left causing piston 367 to open communication between the outside pressures and the interior of expansion chamber 339.

When the craft descent is too rapid from an altitude exceeding the preselected control altitude the operation of the control system is the same as that described above except that in this condition the diaphragms 351 collapse opening the right hand nozzle 356 to relieve the pressure accumulated to the right of piston 358 and again communication between the outside of the cabin and the interior of the differential pressure element is controlled and restricted so that the rate of pressure decrease within the cabin is limited to a predetermined value. The rate of change of cabin pressure will be controlled in the foregoing manner until such time as the inside and outside pressures are equal and then the system will no longer control the cabin pressure.

It will now be readily understood that the foregoing system provides a novel control apparatus wherein, at a preselected flight altitude, cabin pressure is maintained substantially constant and thereafter is progressively lowered as craft flight exceeds the preselected control altitude and a rate of change of pressure device is utilized to limit the rate at which cabin pressure change will take place during flights exceeding the preselected control altitude.

Although several embodiments of the present invention have been illustrated and described in detail it is to be expressly understood that the invention is not limited thereto. Various changes may be made in the design and arrangement of the parts without departing from the spirit and scope of the invention as the same will be now understood by those skilled in the art. For a definition of the limits of the invention, reference is, therefore, to be had to the appended claims.

What is claimed is:

1. Pressure control means for a chamber exposed to varying exterior pressures comprising valve means communicating the interior of said chamber with the exterior thereof, a source of fluid pressure, relay means for connecting said source to and disconnecting said source from said valve means, means comprising a pressure sensitive element having one side thereof in communication with the pressure within said chamber and the other side thereof in restricted communication with said chamber pressure, and nozzle means normally operating said relay means for communicating said source with said valve means and controlled by said pressure sensitive element during a predetermined rate of change of pressure within said chamber due to a rapid rate of change in exterior pressures for operating said relay means to close communication between said source and said valve means.

2. Pressure control means for a sealed aircraft cabin comprising fluid pressure operated valve means for communicating the interior of said cabin with the exterior thereof, means including a source of fluid pressure normally in communication with said valve means, a pressure sensitive device having one side thereof in communication with the pressure within said cabin and the other side thereof in restricted communication with said cabin pressure, and nozzle means normally closed by said pressure sensitive device connected with said first-named means and controlled by said pressure sensitive device during a predetermined rate of change of pressure within said cabin due to a rapid rate of climb or descent of said craft for closing communication between said valve means and said fluid pressure source.

3. Oxygen regulating means for a sealed cabin exposed to varying exterior pressures comprising valve means communicating the interior of said cabin with the exterior thereof, a source of fluid pressure, pressure operated relay means for connecting said source to and disconnecting said source from said valve means for operating said valve means, normally closed nozzle means communicating with said pressure source for building up pressure on said relay means to communicate said pressure source with said valve means whereby said valve means is opened, and pressure responsive means operative when the pressure within said cabin has reached a predetermined value for uncovering said nozzle means whereby the pressure on said relay means is relieved, thereby closing said valve means by disconnecting it from said pressure source.

4. Oxygen regulating means for a sealed cabin exposed to varying exterior pressures comprising valve means communicating the interior of said cabin with the exterior thereof, a source of fluid pressure, pressure operated relay means for connecting said source to and disconnecting said source from said valve means for operating said valve means, normally closed nozzle means communicating with said pressure source for building up pressure on said relay means to communicate said pressure source with said valve means, and aneroid means operative when the pressure within said cabin has reached a predetermined value for uncovering said nozzle means whereby the pressure on said relay means is relieved, thus disconnecting said valve means from said pressure source.

5. Oxygen regulating means for a sealed cabin exposed to varying exterior pressures comprising valve means communicating the interior of said cabin with the exterior thereof, a source of fluid under pressure, pressure operated relay means for connecting said source to and disconnecting said source from said valve means for operating said valve means, a nozzle connected with said relay means and communicating with said source for by-passing fluid pressure from said source, and pressure responsive means normally closing said nozzle whereby pressures are built up on said relay means to communicate said pressure source with said valve means so that said valve means is opened, said pressure responsive means being operative when the pressure within said cabin has reached a predetermined value for uncovering said nozzle whereby the pressure on said relay means is relieved, thereby closing said valve means by disconnecting it from said pressure source.

6. An aircraft having a sealed compartment provided with valve means communicating the interior of said compartment with the exterior thereof, a source of fluid pressure, relay means for connecting said source to and disconnecting said source from said valve means for operating said valve means, means comprising a pressure responsive device normally operating said relay means to communicate said source with said valve means and operative when the pressure within said compartment has reached a predetermined value to operate said relay means to close communication between said source and said valve means, nozzle means connected with said relay means and communicating with said source to by-pass fluid pressure therefrom, and a pressure sensitive element having one side thereof in communication with the pressure within said compartment and the other side thereof in restricted communication with said compartment pressure normally covering said nozzle means and operative during a predetermined rate of change of pressure within said compartment due to a rapid rate of climb or descent of said craft for uncovering said nozzle means to assume control of said relay means thereby overriding control by said pressure device.

7. An aircraft having a sealed compartment provided with valve means communicating the interior of said compartment with the exterior thereof, fluid pressure operated relay means for opening and closing said valve means, nozzle means for controlling operation of said relay means, aneroid means normally controlling said nozzle means for actuating said relay means to open said valve means and operative when the pressure within said compartment has reached a predetermined value corresponding to a predetermined flight altitude to control said nozzle means to actuate said relay means to close said valve means, control means connected with said relay means for assuming primary control of said valve means, a pressure sensitive element having one side thereof in communication with the pressure within said compartment and the other side thereof in restricted communication with said compartment pressure and operative during a predetermined rate of change of pressure within said compartment due to a rapid rate of climb or descent of said craft for actuating said control means to close said valve means, a valve for modifying the operation of said control means, and means having one side thereof exposed to pressures exterior of said compartment and the other side thereof exposed to compartment pressure for overriding the control of said valve means by said aneroid means and for actuating said modifying valve to operate said control means and said relay means to close said valve means during a predetermined rate of climb of said craft above a predetermined minimum level of altitude and to open said valve means during a predetermined rate of descent of said craft during craft flight above said predetermined minimum level of altitude.

8. An aircraft having a sealed compartment provided with valve means communicating the interior of said compartment with the exterior thereof, fluid pressure operated relay means for opening and closing said valve means, nozzle means for controlling the operation of said relay means, a vane for covering and uncovering said nozzle means, and aneroid connected to said vane for normally covering said nozzle means to actuate said relay means to open said valve means and for uncovering said nozzle means when the pressure within said compartment has reached a predetermined value corresponding to a predetermined flight altitude to actuate said relay means to close said valve means, control means connected with said relay means for assuming primary control of said valve means, a pressure sensitive element having one side thereof in communication with said compartment pressure and the other side thereof in restricted communication with said compartment pressure, said element being actuated in one direction during a predetermined rate of pressure drop within said compartment due to a rapid rate of climb of said craft for operating said control means to close said valve means, and actuated in an opposite direction during a predetermined rate of pressure increase within said compartment due to a rapid rate of descent of said craft for operating said control means to close said valve means, a valve for modifying the operation of said control means during craft flight above said predetermined altitude, and means having one side thereof exposed to pressures exterior of said compartment and the other side thereof exposed to compartment pressure for overriding the control of said valve means by said aneroid during flight altitudes above said predetermined altitude and for actuating said modifying valve.

9. An aircraft having a sealed compartment provided with valve means for communicating the interior of said compartment with the exterior thereof, fluid pressure operated relay means for opening and closing said valve means, nozzle means for controlling the operation of said relay means, means for controlling said nozzle means, an aneroid actuated by changes in compartment pressure and connected to said controlling means for normally actuating said nozzle means to actuate said relay means to open said valve means and for controlling said nozzle means when the pressure within said compartment has reached a predetermined value corresponding to the lower limit of a predetermined flight altitude to actuate said relay means to close said valve means, differential pressure responsive means operatively connected to the relay means and valve means actuated by the difference in the exterior atmospheric and compartment pressure during flight altitudes exceeding the upper limit of said predetermined flight altitude for assuming control of said relay means and said valve means to lower the compartment pressure progressively in proportion to increasing flight altitudes, and a differential pressure control means operated by the rate of change in compartment pressure for said pressure responsive means whereby during predetermined rates of change of flight altitude above said predetermined altitude said valve means is operated to provide a lower and proportional rate of change of pressure within said compartment.

10. An aircraft having a sealed compartment provided with valve means for communicating the interior of said compartment with the exterior thereof, fluid pressure operated relay means for opening and closing said valve means, a nozzle for controlling said relay means, a vane for covering and uncovering said nozzle, an aneroid actuated by changes in compartment pressure and connected to said vane for normally covering said nozzle to actuate said relay means to open said valve means and for uncovering said nozzle when the pressure within said compartment has reached a predetermined value corresponding to a predetermined flight altitude to actuate said relay means to close said valve means, pressure responsive means operatively connected to the relay means and actuated during flight altitudes exceeding said predetermined altitude by a difference in pressure between the interior and exterior of said compartment for assuming control of said relay means and said valve means to lower the compartment pressure progressively in proportion to increasing flight altitudes, pressure operated control means for said pressure responsive means having one side thereof in direct communication with the pressure within said compartment and the other side thereof in restricted communication with said compartment pressure, whereby during predetermined rates of change of flight altitude above said predetermined altitude said valve means is operated to provide a lower and proportional rate of change of pressure within said compartment, and a casing mounting said aneroid and said pressure responsive means therein.

11. An aircraft having a sealed compartment provided with valve means for communicating the interior of said compartment with the exterior thereof, a fluid pressure source, fluid pressure operated relay means connected with said source for opening and closing said valve means, nozzle control means for said relay means, means for covering and uncovering said nozzle means, an aneroid actuated by changes in compartment pressure connected to said last-named means for normally covering said nozzle control means to open said valve means and for uncovering said nozzle control means when the pressure within said compartment has reached a predetermined value corresponding to the lower limit of a predetermined flight altitude to close said valve means, pressure responsive means operatively connected to the relay means and actuated during flight altitudes exceeding the upper limit of said predetermined flight altitude by the difference in interior and exterior compartment pressure for assuming primary control of said control means to actuate said valve means to lower the compartment pressure progressively in proportion to increasing flight altitudes, and means having one side thereof in direct communication with the pressure within said compartment and the other side thereof in restricted communication with said compartment pressure for modifying the operation of said pressure responsive means whereby during predetermined rates of change of flight altitude above said predetermined altitude said relay control means are actuated to operate said valve means to provide a lower and proportional rate of change of pressure within said compartment.

12. An aircraft having a sealed compartment provided with valve means for communicating the interior of said compartment with the exterior thereof, a fluid pressure source, relay means connected with said valve means and source for opening and closing said valve means, nozzle means connected to said fluid pressure source and said relay means for controlling said relay means, means comprising an evacuated member in communication with the compartment for controlling said nozzle means to close said valve means when the pressure within said compartment has reached a predetermined value corresponding to a preselected flight altitude and to open said valve means when the craft is below said preselected altitude, and means responsive to a predetermined rate of altitude change of said craft having one side thereof in direct communication with said compartment pressure and the other side thereof in restricted communication with said compartment pressure for modifying control of said valve means to prevent an equal rate of pressure change within said compartment corresponding to said predetermined rate of craft altitude change.

13. An aircraft having a sealed compartment provided with valve means for communicating the interior of said compartment with the exterior thereof, a fluid pressure source, relay means connected with said valve means and source for opening and closing said valve means, nozzle means for said relay means connected with said source to by-pass fluid pressure therefrom, means for controlling said nozzle means, an evacuated member in communication with the compartment for actuating said controlling means for normally covering said nozzle means to build up pressure on said relay means to open communication between said source and said valve means to open said valve and for uncovering said nozzle means to relieve said fluid pressure on said relay means to close communication between said source and said valve means to close said valve when the pressure within said compartment has attained a predetermined value, and means responsive to a predetermined rate of altitude change of said craft having one side thereof in direct communication with said compartment pressure and the other side thereof in restricted communication with said compartment pressure for modifying control of said valve means to prevent an equal rate of pressure change within said compartment corresponding to said predetermined rate of craft altitude change.

14. An aircraft having a sealed compartment provided with valve means for communicating the interior of said compartment with the exterior thereof, a fluid pressure source, fluid pressure operated relay means connected with said source for opening and closing said valve means, control means for said relay means, an aneroid for operating said control means to actuate said relay means to open communication between said source and said valve means under one pressure condition in said compartment and for operating said control means to actuate said relay means to close communication between said source and said valve means under a second pressure condition in said compartment, a pressure sensitive element having one side thereof exposed to the pressure within said compartment and the other side thereof exposed to the pressure exterior of said compartment, said element responding to a predetermined pressure differential between the interior and exterior of said compartment for assuming primary control of said relay control means to operate said valve means to vary the compartment pressure in proportion to varying flight altitudes, and means providing a restricted communication between the compartment exterior and said other side of said element whereby during a predetermined rate of flight altitude change above a preselected altitude said relay control means is actuated to operate said valve means to provide a lower and proportional rate of pressure change within said compartment.

15. An aircraft having a sealed compartment provided with valve means for communicating the interior of said compartment with the exterior thereof, a fluid pressure source, fluid pressure operated relay means connected with said source for opening and closing said valve means, control means for said relay means, an aneroid for operating said control means to actuate said relay means to open communication between said source and said valve means under one pressure condition within said compartment and for operating said control means to actuate said relay means to close communication between said source and said valve means under a second pressure condition within said compartment, a pressure sensitive element having one side thereof exposed to exterior compartment pressure and the other side thereof exposed to interior compartment pressure, said element responding to a predetermined pressure differential between the interior and exterior of said compartment for assuming primary control of said relay control means to operate said valve means to vary the compartment pressure in proportion to varying flight altitudes, means providing a restricted communication between the compartment exterior and said one side of said element whereby during a predetermined rate of flight altitude change above a preselected altitude said relay control means is actuated to operate said valve means to provide a lower and proportional rate of pressure change within said compartment, a casing, and means mounting said aneroid and said pressure responsive element in tandem within said casing.

16. An aircraft having a sealed compartment provided with valve means for communicating the interior of said compartment with the exterior thereof, fluid pressure operated relay means for opening and closing said valve means, nozzle means for controlling said relay means, control means for said nozzle means, aneroid means connected to said control means for operating said relay means to open said valve means at one compartment pressure and for operating said relay means to close said valve means at a second compartment pressure, a pressure element having one side thereof in communication with exterior compartment pressure and an opposite side thereof in communication with the interior compartment pressure, said element responding to a predetermined differential in the exterior and interior compartment pressures for assuming primary control of said relay means to vary the compartment pressure in proportion to said predetermined differential pressure, and a rate of pressure change device having one side thereof in communication with the compartment pressure and an opposite side thereof in restricted communication with said compartment pressure and responding to a predetermined rate of interior compartment pressure change due to predetermined rate of pressure change exterior of said compartment for controlling communication between the compartment exterior and said one side of said pressure element to modify the control of said relay means by said pressure element.

17. An aircraft having a sealed compartment provided with valve means for communicating the interior of said compartment with the exterior thereof, fluid pressure operated relay means for opening and closing said valve means, nozzle means for controlling said relay means, control means for said nozzle means, aneroid means connected to said control means for operating said relay means to open said valve means at one compartment pressure and for operating said relay means to close said valve means at a second compartment pressure, a pressure element having one side thereof in communication with exterior compartment pressure and an opposite side thereof in communication with the interior compartment pressure, said element responding to a predetermined differential in the exterior and interior compartment pressures for assuming primary control of said relay means to vary the compartment pressure in proportion to said predetermined differential pressure, a rate of pressure change device having one side thereof in communication with the compartment pressure and an opposite side thereof in restricted communication with said compartment pressure and responding to a predetermined rate of interior compartment pressure change due to a predetermined rate of pressure change exterior of said compartment for controlling communication between the compartment exterior and said one side of said pressure element to modify the control of said relay means by said pressure element, and a casing within said compartment mounting said aneroid means, said pressure element and said rate device therein.

18. An aircraft having a sealed compartment provided with valve means for communicating the interior of said compartment with the exterior thereof, fluid pressure operated relay means for opening and closing said valve means, nozzle means for controlling operation of said relay means, control means for said nozzle means, an aneroid connected to said control means for operating said relay means to open said valve means at one compartment pressure and for operating said relay means to close said valve means at a second compartment pressure, a pressure element having one side thereof in communication with exterior compartment pressure and an opposite side thereof in communication with the interior compartment pressure whereby said element responds to a predetermined differential in the exterior and interior compartment pressures to assume primary control of said relay means to vary the compartment pressure in proportion to said predetermined differential pressure, and a pressure sensitive device having one side thereof in communication with the compartment pressure and an opposite side thereof in restricted communication with said compartment pressure, said device being actuated in one direction in response to a predetermined rate of pressure drop in exterior pressure to control communication between the compartment exterior and said one side of said pressure element to modify control of said relay means by said pressure element, and actuated in another direction in response to a predetermined rate of pressure increase to control communication between compartment pressure and said one side of said pressure element to likewise modify control of said relay means by the pressure sensitive element.

19. An aircraft having a sealed compartment provided with valve means for communicating the interior of said compartment with the exterior thereof, fluid pressure operated relay means for opening and closing said valve means, nozzle means for controlling operation of said relay means, control means for said nozzle means, aneroid means connected to said control means for operating said relay means to open said valve means at one compartment pressure and for operating said relay means to close said valve means at a second compartment pressure, pressure responsive means having one side thereof in communication with the exterior compartment pressure and an opposite side thereof in communication with the interior compartment pressure whereby said pressure means responds to a predetermined differential in the exterior and interior compartment pressures to assume primary control of said relay means to vary the compartment pressure in proportion to said predetermined differential pressure, and means for modifying the operation of said pressure responsive means in accordance with a predetermined rate of exterior pressure change to provide a lower and proportional rate of change of pressure within said compartment.

20. Valve means for opening and closing communication between the interior and exterior of a compartment comprising a plurality of valves, pairs of operating bellows for each of said valves, the bellows of each pair being arranged so that upon expansion of one of them the other contracts thereby moving their respective valves in one direction and whereby upon contraction of said one bellows of each pair the other expands moving said valves in an opposite direction, and pairs of Sylphons for each of said valves, the first Sylphon of one valve communicating with the second Sylphon of a second valve and the first Sylphon of the second valve communicating with the second Sylphon of a third valve whereby upon expansion of the first Sylphons due to movement of their related valves in one direction the second Sylphons thereof contract and upon movement of the valves in an opposite direction the first Sylphons contract and the second Sylphons expand.

21. Valve means for opening and closing communication between the interior and exterior of a compartment comprising a plurality of valves, means for operating said valves simultaneously and in parallel, and pairs of Sylphons for each of said valves, the first Sylphon of one valve communicating with the second Sylphon of a second valve and the first Sylphon of the second valve communicating with the second Sylphon of a third valve whereby upon expansion of the first Sylphons of each pair due to movement of their related valves in one direction the second Sylphons thereof contract and upon movement of the valves in an opposite direction the first Sylphons contract and the second Sylphons expand.

PAUL A. NOXON.